United States Patent [19]

Saggese et al.

[11] 4,219,640
[45] Aug. 26, 1980

[54] POLYMERS OF VINYL CHLORIDE HAVING LOW VINYL CHLORIDE MONOMER CONTENT, AND METHOD OF MAKING SAME

[75] Inventors: Michael F. Saggese, Nashville, Tenn.; Fred V. Owens, Trenton; Barbara Fila, Edison, both of N.J.

[73] Assignee: Tenneco Chemicals, Inc., Saddle Brook, N.J.

[21] Appl. No.: 835,541

[22] Filed: Sep. 22, 1977

Related U.S. Application Data

[63] Continuation-in-part of Ser. No. 613,711, Sep. 15, 1975, abandoned.

[51] Int. Cl.² ............................................. C08F 6/00
[52] U.S. Cl. .............................. 528/501; 260/18 PF; 260/45.75 J; 260/45.75 W
[58] Field of Search ............... 528/501; 260/45.75 J, 260/45.75 W, 18 PF

[56] References Cited

U.S. PATENT DOCUMENTS

| | | | |
|---|---|---|---|
| 1,920,403 | 8/1933 | Klatte | 528/501 |
| 2,674,593 | 7/1951 | Condo | 260/92.8 |
| 3,052,663 | 9/1962 | Bodlaender | 260/92.8 |
| 3,259,609 | 7/1966 | Satake | 260/88.2 |
| 3,475,398 | 10/1969 | Jobard | 260/92.8 |
| 3,787,187 | 1/1974 | DeWitt | 23/285 |
| 3,843,616 | 10/1974 | Richardson | 260/87.5 C |
| 3,956,249 | 5/1976 | Goodman et al. | 528/500 |

FOREIGN PATENT DOCUMENTS

| | | |
|---|---|---|
| 793505 | 7/1972 | Belgium . |
| 1801274 | 7/1969 | Fed. Rep. of Germany .......... 260/92.8 |
| 1801275 | 2/1969 | Fed. Rep. of Germany .......... 260/92.8 |
| 2331895 | 1/1974 | Fed. Rep. of Germany .......... 528/499 |
| 1261921 | 6/1961 | France . |

OTHER PUBLICATIONS

Chemistry and Technology of Polyvinyl Chloride, Gottesman, R. T., Applied Pol. Sci., pp. 349–380 (1975), A.C.S.
The Practical Methods of Organic Chemistry, Gattermann, pp. 16, 25 (1923)

*Primary Examiner*—Stanford M. Levin
*Attorney, Agent, or Firm*—James P. Scullin

[57] ABSTRACT

Dry particulate vinyl chloride homopolymer and copolymers, and dry particulate compositions containing major proportions of these polymers, having 2 parts or less per million of vinyl chloride monomer are provided. The vinyl chloride monomer can be so low as to be undetectable. The reduction in monomer content is achieved by subjecting the dry polymer particles to elevated temperature, agitation, and subatmospheric pressure.

10 Claims, No Drawings

POLYMERS OF VINYL CHLORIDE HAVING LOW VINYL CHLORIDE MONOMER CONTENT, AND METHOD OF MAKING SAME

This is a continuation-in-part of our copending application Ser. No. 613,711 which was filed on Sept. 15, 1975, abandoned.

SUMMARY OF THE INVENTION

This invention relates to a process whereby vinyl chloride monomer (VCM) is removed from vinyl chloride homopolymers and from copolymers of vinyl chloride and one or more of other unsaturated monomers capable of undergoing such copolymerization. In the process disclosed, vinyl chloride homopolymers or copolymers in dry particulate form and at an elevated temperature are agitated and subjected to subatmospheric pressure in the absence of water, steam, or volatile organic liquids. Preferably, a heat stabilizer is admixed with the polymer particles during the process, although the process can be conducted in the absence of a stabilizer if desired. Other conventional compounding ingredients can also be present.

The invention also relates to polymers of low monomer content which result from the process disclosed herein. Such polymers have a vinyl chloride monomer content of 2 parts or less per million. Preferably, the vinyl chloride monomer content is 1 part or less per million, and most preferably is so low as to be undetectable by a gas chromatographic method having a sensitivity of analyzing 0.1 part per million. Parts per million refers to parts by weight of monomer per million parts by weight of polymer, or per million parts by weight of total composition.

BACKGROUND OF THE INVENTION

Homopolymers and copolymers of vinyl chloride are among the most important plastics, or polymeric compositions, of commerce. These polymers have been produced in significant and increasing quantities for over thirty years, and currently are manufactured at a rate exceeding five billion pounds annually.

Vinyl chloride polymers are made by a number of processes, including emulsion, suspension, solution, and bulk. Each of these processes has achieved some degree of commercial success, the choice of process being largely determined by the desired characteristics of the polymer, and each is capable of an economically acceptable degree of conversion of monomer to polymer. However, the polymerization processes as actually practised commercially result in polymers having a high content of vinyl chloride monomer ranging, for example, from 100 to 15,000 or more parts of monomer per million of polymer (weight/weight). Such high monomer content resins, or polymers, have heretofore been technically and economically acceptable to the art. Both monomer and polymer are relatively low in cost, and it had been believed until recently that vinyl chloride monomer was essentially physiologically harmless. Further, since these polymers are generally fabricated into useful compounds, shapes, and articles by heating them at elevated temperatures ranging from about 125° C. to 200° C. or higher, it had been assumed that residual monomer was driven off by such heat treatment since vinyl chloride monomer boils at −13.4° C. Hence, there has been no particular concern over the amount of free VCM in polymers and little or no effort has been expended in reducing this amount, until recently.

Quite surprisingly, in view of the fact that VCM is a gas at ordinary temperatures and pressures, boiling at −13.4° C., it has been found to be tenaciously held in the free and unreacted state in polymers, even after the polymers have been processed and fabricated at elevated temperatures. Illustratively, compostions based on vinyl chloride homopolymers or copolymers, plasticized or unplasticized, are generally prepared utilizing various combinations of process steps including blending at elevated temperatures in a ribbon blender or Henschel mixer, extrusion, fusion using a two-roll mill, fusion using a Banbury or other intensive mixer, calendering, and press-polishing. Temperatures commonly employed for extrusion, two-roll mill or intensive mixer fusion, calendering, and press-polishing range from about 170° C. to 200° C. or even higher, and the time at which the polymer compositions are held at these elevated temperatures is approximately the same as the time required to remove the VCM in the method of the present invention. Despite the elevated temperatures employed, only a portion of the VCM, approximately 50% or less, originally present is removed during a typical processing cycle for a rigid polyvinyl chloride composition. It has not been possible to achieve a non-detectable VCM level in such compositions using conventional processing cycles and commercial polymers having the usual amounts of VCM. This has resulted in polyvinyl chloride (PVC) being judged unacceptable for certain uses for which it is otherwise eminently suitable. For example, alcoholic beverages contained in bottles made of PVC have been discovered to be contaminated with vinyl chloride monomer extracted from the bottle wall. As a consequence, PVC bottles have been disallowed for packaging such beverages. Although PVC is know to be thermally unstable, no evidence exists to establish that VCM is generated as a result of such degradation. Studies of PVC degradation by numerous investigators over a period of many years have failed to reveal the presence of vinyl chloride among the decomposition products. Hence, any monomeric vinyl chloride found in polymer must be residual monomer, unconverted during the polymerization process.

A more recent development has caused additional concern about residual VCM levels, and has spurred interest in reducing them. Evidence has been produced which implicates vinyl chloride monomer as one possible cause of a rare liver cancer known as angiosarcoma. Knowledge of this potential health hazard has inspired research into methods for reducing or eliminating the residual VCM in polymers, particularly for polymers to be used in the manufacture of articles for handling and packaging of foods, beverages, cosmetics, drugs, and pharmaceuticals.

To this end, several methods have been proposed, including stripping of aqueous suspensions or emulsions of polymer at temperatures of up to 125° C. during the polymer manufacturing process; adding a volatile organic liquid to such aqueous suspensions or latices of polymer, and then stripping at elevated temperatures; extracting latices of PVC with a liquid hydrocarbon as disclosed in U.S. Pat. No. 3,052,663 to Bodlaender et al; and steaming of wet polymer cake derived from centrifuging of such aqueous suspensions, or latices, of polymer, as disclosed in U.S. Pat. No. 3,956,249 to Goodman et al. Also, German Offenlegungsschrift No.

2,331,895 discloses a process for removing VCM from vinyl chloride polymers by heating the polymer to a temperature between the transition range and 180° C., condensing steam directly onto the polymer, and then cooling the polymer below its transition range by evaporating the steam which has condensed on the polymer.

Although these methods have achieved some degree of success in reducing, or even eliminating, residual VCM in the polymer, none has been completely satisfactory. Each of these prior methods suffers from one or more disadvantages, such as the need to install additional and costly equipment; an increase in the time required to manufacture a given amount of polymer; and the fact that the exposure of the polymer to elevated temperatures for sufficient time to reduce the VCM content to a very low or non-detectable level may cause some degradation and color formation thus rendering the polymer unsuitable for some uses wherein high quality is critical.

DETAILED DESCRIPTION OF THE INVENTION

We have discovered an effective and low-cost method whereby the residual VCM content of homopolymers and copolymers of vinyl chloride is reduced to very low levels, and even to levels undetectable by a gas chromatographic procedure which is sensitive to 0.1 parts per million (ppm) VCM, regardless of the manufacturing process used to make the polymer, i.e. emulsion, suspension, solution, or bulk. This novel method overcomes the deficiencies of prior art methods, is carried out rapidly in equipment commonly employed in the art of compounding PVC, and produces polymer of low or non-detectable VCM content without causing undesirable polymer degradation and discoloration. Our novel method is applicable to polymers made by older and conventional processes wherein up to 15,000 ppm or even higher amounts of VCM are retained in the polymer; and can if desired, be employed to reduce to 2 parts per million, 1 part per million, or to a non-detectable level, the VCM content of polymers made by the more recent processes involving high temperature stripping, stripping with the aid of a volatile organic liquid, or steaming of wet polymer cake.

Even where such recent processes may nominally be capable of reducing the VCM content to levels achieved by the process of this invention, there may be occasions where off-grade batches containing unacceptably high amounts of VCM are inadvertently produced due to mechanical failure, power failure, human error, and so forth. In such an event, the process of the present invention can be utilized to further reduce the VCM content of off-grade batches once they have been converted to dry particulate form, and thus to recover the material and avoid an economic loss.

The novel method of the invention is applicable to any homopolymer or copolymer of vinyl chloride which is in dry particulate form, i.e. in the form of finely divided, dry, discrete particles as conventionally produced in the art. Suitable particles can range in size, by way of example but not limitation, from about 0.2 micron to 150 microns or greater. The particles can be of any regular or irregular shape including spherical, shrunken orange, popcorn, or modified popcorn; and can be of any degree of porosity.

In carrying out the method of this invention, the dry polymer (this term including both homopolymers and copolymers of vinyl chloride) particles are heated to an elevated temperature, subjected to high speed turbulent agitation, and subjected to vacuum to reduce the pressure within the containing chamber to below that of the surrounding atmosphere. Vacuum is maintained for a period of time sufficient to reduce the VCM content of the polymer to the desired level, following which the chamber is opened to the atmosphere. This process is carried out in the absence of water, steam or volatile organic liquids.

The steps in this method can be carried out concurrently or sequentially, without departing from the scope of the present invention. Thus, in one embodiment the dry polymer particles can be simulaneously agitated, heated, and subjected to subatmospheric pressure. In other embodiments, the dry polymer particles can be heated, and then agitation and vacuum can be simultaneously applied; or the dry polymer particles can be simultaneously agitated and heated, followed by application of vacuum. In a further, preferred, embodiment the dry polymer particles are simultaneously agitated and heated to a desired temperature, the agitation is stopped, and vacuum is applied until the VCM content of the polymer is reduced to the desired level. It will be apparent from the aforegoing that the three operations can be carried out in a variety of combinations or sequences, the only limitation being that vacuum is applied while the dry polymer particles are at the desired elevated temperature. It will also be apparent that the process can be operated as either a continuous process or as a batch process.

The size and geometrical configuration of the high-speed mixer, and the design of the agitator, are not critical. Any suitable mixing apparatus capable of producing turbulent agitation, heating the polymer, and maintaining reduced pressure can be used. We have found that high-speed mixers commonly employed for PVC compounding, such as the Henschel Fluid Mixer and comparable mixers including the Papenmeier or Littleford mixers, are suitable. Using these mixers, the frictional heat developed by the high shearing forces produced by rotating impellers causes a rapid increase in the temperature of the material being agitated, so that it is often unnecessary to supply heat from an external source. In fact, it is frequently necessary to supply coolant to the outer jacket of the mixing chamber in order to prevent too high a temperature build-up.

In carrying out the method of the present invention, the temperature to which the polymer is raised will depend largely on the molecular weight and fusion temperature of the particular polymer or polymer and stabilizer composition employed. It is desirable to use the highest temperature possible in order to shorten the time required to drive out the monomer. However, the temperature must not be so high that the polymer becomes discolored or otherwise degraded. In addition to the fact that residual VCM is tenaciously held and not removed once the polymer has been fused into a cohesive mass, it is a desirable object of this invention to obtain the low monomer content polymer in dry particulate form for ease of subsequent compounding or handling. We prefer that the temperature to which the polymer is raised be at least about 120° C.

It is believed that those skilled in the art will have no difficulty in determining a suitable maximum temperature for a given polymer, or polymer and stabilizer composition, in carrying out the process of this invention, since the use of high-intensity mixers of the Henschel, Papenmeier, and Littleford typed for preparing PVC dryblend compounds and vinyl chloride copolymer dryblend compounds is conventional, and this presents a similar problem in avoiding fusion and decomposition of the polymer.

The degree to which the pressure in the chamber is reduced is not critical, but should be sufficient to remove VCM in a short period of time, in the interest of economy and to minimize the time at which the polymer is held at an elevated temperature. To some extent, the degree of vacuum required will depend on the temperature of the polymer, the amount of VCM initially present in the polymer, and the degree to which it is desired to reduce the VCM level. It will be apparent that, in general, the greater the vacuum (or the lower the pressure in the chamber) the more rapidly the VCM will be removed. By way of illustration, we have found that VCM can be virtually completely removed from a low molecular weight vinyl chloride homopolymer at 143° C. by maintaining a vacuum of 26 inches of mercury for only 4 minutes. Obviously, a vacuum of higher degree would require a shorter time and a vacuum of lower degree a longer time to remove an equivalent amount of VCM. For a given polymer having a given amount of residual VCM, an optimum pressure can be very easily determined by a skilled operator, with a minimum of experimentation.

Although the process of this invention can be carried out on dry particulate polymers alone, it is prudent to have a small amount of a heat stabilizer intimately dispersed throughout, or sorbed into or on, the polymer particles to avoid thermal degradation of the polymer in the event that the temperature is inadvertently allowed to rise too high. Having said stabilizer present constitutes a preferred mode of carrying out the process. Any of the heat stabilizers known to the art can be used, including metal salts of acids or phenols, organic phosphites, phenolic or amine type antioxidants, polyols, epoxy compounds, and organotin compounds, provided that they are essentially non-volatile under the conditions employed. Although either solid or liquid stabilizers can be used, liquids are preferred, in amounts ranging from about 0.1 part to about 10 parts by weight per 100 parts by weight of polymer. We prefer to use epoxy compounds or organotin compounds for this purpose.

When a heat stabilizer is employed, it can be dispersed throughout the dry polymer particles by any convenient procedure, such as by tumbling or ribbon blending. It is most convenient to utilize the same mixer for this purpose as is used for turbulently mixing and heating the polymer. Such "high-speed" mixers usually have a low speed setting also, thus it is possible to disperse the stabilizer in the polymer particles at low speed without substantial heat build-up, and then to increase the impeller speed to produce turbulent agitation and raise the temperature of the polymer.

After removal from the polymer, and from the mixing chamber by the application of vacuum, the VCM can be collected by any convenient means such as condensation to a liquid, dissolving in a solvent, or sorption by a solid carrier, and either safely disposed of or reused in polymerization.

Once the free VCM content of the dry polymer particles has been reduced to the level desired, it is prudent to lower the temperature of the batch while continuing to agitate it at a low speed, to avoid fusion or agglomeration of the particles and to avoid thermal decomposition due to heat being retained in the interior of the batch. If other compounding ingredients are to be added to the polymer before it is fabricated into a finished article, it is convenient to add them after the vacuum has been removed and before the batch is cooled. Such compounding ingredients may include: additional heat stabilizers, light stabilizers, antistatic agents, impact modifiers, flow modifiers, flame retardants, lubricants, dyes, pigments, and so forth. If it desired to produce a flexible article rather that a rigid one, one or more plasticizers can be added.

As previously mentioned, the process of this invention is not limited in its utility to homopolymers of vinyl chloride, but can also be used for reducing the residual VCM level in any of the vinyl chloride copolymers. Among the monomers which can be copolymerized with vinyl chloride are: acrylic acid, acrylonitrile, methyl acrylate, ethyl acrylate, butyl acrylate, 2-ethylhexyl acrylate, diethyl fumarate, dioctyl fumarate, maleic anhydride, diethyl maleate, dioctyl maleate, ethylene, propylene, isobutylene, methacrylonitrile, methacrylic acid, methyl methacrylate, ethyl methacrylate, trimethylolpropane trimethacrylate, vinyl acetate, vinyl alcohol, vinylidene chloride, N-vinylcarbazole, vinyl isobutyl ether, and N-vinylpyrrolidone. It will be understood that in the present context the term "copolymer" is used in the generic sense to include also terpolymers and polymers containing four or more different mers.

The following examples illustrate the invention, and are not to be considered limitative thereof.

EXAMPLE 1

The polymer used was a low molecular weight vinyl chloride homopolymer in dry particulate form having a number average molecular weight of 29,000, and a fusion temperature of 150°–155° C. It was found to contain 376 ppm free vinyl chloride monomer when analyzed by gas chromatography. A screen analysis showed that all of the polymer particles passed through a 60 mesh screen, and 60% were retained on a 140 mesh screen.

A 300 pound quantity of this polymer was charged to a Littleford high intensity mixer. While operating the mixer at slow speed, 15 pounds of epoxidized soybean oil was added and uniformly dispersed throughout the resin particles. The mixer was then closed and run at fast speed, the temperature of the polymer rising to 143° C. in about 4 minutes. As soon as the temperature reached 143° C., the agitation was stopped, and the pressure in the mixing chamber was lowered by applying a vacuum source. Within about 2 minutes, a vacuum of 26 inches of mercury was attained in the chamber, and was maintained for an additional 4 minutes. The batch was then dropped to the cooler and cooled to room temperature.

The product was a finely divided white, free-flowing, powder. When analyzed by gas chromatography, the free VCM content was found to be 2 ppm.

EXAMPLE 2

Another portion of the homopolymer used in Example 1, having a free VCM content 376 ppm, was mixed with 5 PHR epoxidized soybean oil and 2 PHR of barium/cadmium soap stabilizer to form a homogeneous blend. The blend of polymer and stabilizer was charged to a three-roll calender at a temperature of 165°–200° C., and converted into a sheet having a thickness of 10 mils, in a total time of about 5 minutes. After cooling to room temperature, the sheet was analyzed for free VCM by means of gas chromatography. The VCM level was 301 ppm.

This comparative example demonstrates that VCM is tenaciously retained in a PVC resin, once the resin has been fused into a coherent mass, even at greatly elevated temperatures.

EXAMPLE 3

The procedure of Example 1 was repeated, using a low molecular weight vinyl chloride homopolymer in dry particulate form having an initial free VCM content of 40 ppm. After completion of the process, the polymer was analyzed by gas chromatography. No free VCM was detected.

EXAMPLE 4

Example 4 is another comparative example illustrating that VCM is tenaciously retained in a fused PVC film.

The material used was commercial rigid PVC film of 15 mils thickness. This film was composed of a low molecular weight vinyl chloride homopolymer, together with minor amounts of an acrylic polymer as a processing aid, an organotin mercaptide stabilizer, and a lubricant. The film was found to contain 50 parts per million VCM, by gas chromatography.

A portion of this film was freely suspended in a forced-circulation oven at atmospheric pressure and 75° C., for a period of 24 hours. At the end of this time the VCM content was again measured by gas chromatography, and was found to be 45 parts per million.

EXAMPLE 5

A 300 pound quantity of a high molecular weight vinyl chloride homopolymer in dry particulate form (weight average molecular weight 80,000, 55% passing through a 100 mesh screen) was charged to a Littleford mixer. This resin had a VCM content of 36 parts per million, by gas chromatography. While operating the mixer at low speed, 5.6 pounds of dibutyltin bis(isooctyl thioglycolate) was added and uniformly dispersed throughout the resin particles. The mixer was then closed and run at high speed for 5 minutes, the temperature of the resin particles rising to 148° C. The agitation was stopped and the pressure in the mixer was lowered to 25 inches of mercury in about 1½ minutes. After maintaining this pressure for an additional 4 minutes, the vacuum was shut off, and the chamber was opened to the atmosphere. The batch was dropped to the cooler and cooled to room temperature.

The product was a finely divided, free-flowing white powder. When analyzed by gas chromatography, no VCM could be detected.

EXAMPLE 6

Example 5 was repeated. Again, no VCM could be detected in the product.

EXAMPLE 7

Example 5 was repeated again, except that the stabilizer, dibutyltin bis(isooctyl thioglycolate) was omitted. No VCM could be detected in the product when analyzed by gas chromatography.

EXAMPLE 8

Example 8 is a comparative example, to illustrate the effect of vacuum alone, in the absence of heat. The PVC used was a high molecular resin in dry particulate form having the same molecular weight and particle size distribution as that used in Examples 5-7, but having a VCM content of 94 parts per million. A 300 pound quantity of this resin was charged to a Littleford mixer, the mixer was closed, and the pressure was reduced to 26 inches of mercury and maintained at that pressure for 10 minutes.

After the mixer was opened to the atmosphere, the resin was found to have a VCM content of 92 parts per million.

EXAMPLE 9

Example 9 is a comparative example to illustrate the effect of conventional processing conditions on reducing VCM content. The resin was a low molecular weight vinyl chloride homopolymer in dry particulate form.

The following composition was uniformly blended in a ribbon blender at room temperature:

|  | pounds |
|---|---|
| PVC | 300 |
| impact modifier (ABS) | 18¾ |
| acrylic processing aid | 9¾ |
| dibutyltin bis(isooctyl thioglycolate) | 6 |
| lubricant (glycerol triester, solid) | 2¼ |

After a homogeneous, free-flowing, powder was produced, the VCM content was determined by gas chromatography and was found to be 470 parts per million.

The powder blend was fused to a homogeneous solid in a heated, screw-type continuous mixer from which it was discharged in the form of pigs. The hot pigs were then charged to a 4-roll inverted L calender having roll surface temperatures of 154° C., 154° C., 198° C., and 162° C., and calendered into film having a thickness of 7.5 mils. After the film had been cooled to room temperature, it was analyzed by gas chromatography and was found to contain 148 parts per million of VCM.

EXAMPLE 10

Example 10 is a comparative example to illustrate the effect of eliminating the use of vacuum in the process of present invention. The composition and batch size used in this example were the same as those used in Example 9.

The dry particulate PVC was charged to a Littleford mixer which was run at low speed until the temperature of the resin reached 38° C. The organotin stabilizer was then added, and the mixer was run at high speed until the temperature of the mix reached 104° C. At this point the agitation was stopped, the dry ingredients (impact modifier, processing aid, and lubricant) were added, and the mixer was again run at high speed until the temperature of the blend reached 104° C. The batch was then dropped to the cooler, the temperature was reduced to 43° C., and the batch was discharged. The VCM content of this blend was found to 140 parts per million, by gas chromatographic analysis.

This blend was then fused in a screw-type continuous mixer and calendered into a 7.5 mil film, following the procedures of Example 9. The VCM content of the calendered film was 36 parts per million, by gas chromatographic analysis.

Examples 11-15 illustrate the effect of temperature on reduction of VCM content. The compositions were the same as that used in Example 9, but using a dry particulate PVC homopolymer having a number average molecular weight of 30,000. A different batch of this PVC resin was used for each example.

EXAMPLE 11

The PVC used had an initial VCM content of 51 parts per million (ppm). In this example, 300 pounds PVC resin was charged to a Littleford mixer, the pressure in the mixer was reduced to 26 inches of mercury, and the mixer was run at high speed until the resin temperature reached 93° C. The mixer was then vented to the atmosphere and the other dry ingredients were added. The mixer was operated at low speed and the organotin stabilizer was added. The mixer was then operated at high speed until the batch temperature reached 104° C. The pressure was again reduced to 26 inches of mercury, the agitation was turned off, and the pressure was maintained at 26 inches of mercury for an additional 2 minutes. The mixer was then opened to the atmosphere and run at high speed for 3 minutes, the temperature of the batch reaching 110° C. The blend was then dropped to the cooler.

EXAMPLE 12

Example 11 was repeated, but with changes in the sequence of operations and in temperature. The PVC resin, which had a VCM content of 54 ppm, was charged to the mixer which was run at high speed until the resin temperature reached 93° C. Vacuum was then applied to reduce the pressure to 26 inches of mercury, this pressure being maintained for 2 minutes. The procedure of Example 11 was then followed, except that the temperature was allowed to rise to 115° C. after the dry ingredients and the stabilizer were added, and to 121° C. before the pressure was reduced for the second time. A mixing time of 5 minutes at high speed was required to raise the temperature to 121° C., at which point the batch was dropped to the cooler.

EXAMPLE 13

The procedure of Example 12 was repeated, using a batch of PVC resin having a VCM content of 39 ppm, and employing higher temperatures at each stage of the process. The resin temperature was raised to 121° C. before the first application of vacuum, to 127° C. after the addition of the dry ingredients and the stabilizer and before the second application of vacuum, and to 132° C. after shutting of the vacuum and opening to the atmosphere. This batch was dropped to the cooler at 132° C.

EXAMPLE 14

The procedure of Example 12 was again followed, using a batch of resin having a VCM content of 41 ppm, and employing still higher temperatures. The temperatures were 132° C. before the first application of vacuum, 138° C. after adding the dry ingredients and the stabilizer and before the second application of vacuum, and 143° C. after shutting off the vacuum and opening. This batch was dropped to the cooler at 143° C.

EXAMPLE 15

The procedure of Example 12 was followed again, using a batch of PVC resin having a VCM content of 46 ppm, but employing temperatures of 132° C. before the first application of vacuum, 138° C. after adding the dry ingredients and the stabilizer and before the second application of vacuum, and 149° C. after shutting off the vacuum and opening. This batch was dropped to the cooler at 149° C.

The VCM content for Examples 11-15 was measured by gas chromatography, on samples of the resin taken after the first application of heat and vacuum before the addition of other ingredients, and on the final blend after cooling to room temperature. The results are summarized in Table I.

Table I

| | VCM Content, ppm | | |
|---|---|---|---|
| Example | Resin Before Treatment | Resin After Heat and Vacuum | Final Blend |
| 11 | 51 | 31 | 6.2 |
| 12 | 54 | 31 | 2.0 |
| 13 | 39 | 3.0 | 1.4 |
| 14 | 41 | non-detectable | non-detectable |
| 15 | 46 | non-detectable | non-detectable |

EXAMPLE 16

Three-hundred pounds of a vinyl chloride/ethylene copolymer in dry particulate form, having a number average molecular weight of 30,000 and a VCM content of 376 ppm, and 6 pounds of dibutyltin bis(isooctyl thioglycolate) were charged to a Littleford mixer which was run at high speed until the temperature of the mixture reached 132° C., requiring 4 minutes. The agitator was stopped, and the pressure inside the mixer was reduced to 26 inches of mercury in 1 minute. While maintaining this pressure, the mixer was run at low speed for 2 minutes, the batch temperature remaining at 132° C. The mixer was then opened to the atmosphere and batch was dropped to the cooler.

A portion of this batch was analyzed for VCM by gas chromatography, and was found to contain 2 ppm.

EXAMPLE 17

The resin used in this example was a dry particulate low molecular weight vinyl chloride homopolymer, number average molecular weight 30,000, having a VCM content of 103 ppm. A 300 pound quantity was charged to a Littleford mixer. The mixer was run at low speed while 6 pounds of dibutyltin bis(isooctyl thioglycolate) was added. The mixer was then operated at high speed until the batch temperature reached 143° C. requiring 8 minutes. The agitator was then turned off and the pressure inside the mixing chamber was reduced to 26 inches of mercury, within one minute. This pressure was maintained for 4 minutes, at the end of which time the mixer was opened to the atmosphere and the batch was dropped to the cooler.

A sample of this batch was analyzed for VCM, by gas chromatography. No VCM was detectable.

EXAMPLE 18

Example 17 was repeated, using a different sample of the same grade of dry particulate PVC resin having a VCM content of 112 ppm.

After being processed as in Example 17, the batch was found by gas chromatographic analysis to have a VCM content of 0.16 ppm.

EXAMPLE 19

Example 17 was repeated again, using another sample of the same grade of dry particulate PVC resin having a VCM content of 158 ppm.

After being processed as in Example 17, the batch was analyzed for VCM by gas chromatography. No VCM could be detected.

EXAMPLE 20

This example illustrates a food packaging grade PVC composition, having the following formulation:

|  | pounds |
|---|---|
| PVC homopolymer | 300 |
| impact modifier, ABS type | 55 |
| acrylic processing aid | 8.5 |
| calcium/zinc complex stabilizer | 4.5 |
| epoxidized vegetable oil | 6.0 |
| ester wax lubricant | 0.3 |

The PVC was a low molecular weight resin in the form of dry particles having a VCM content of 158 ppm.

The PVC was charged to a Littleford mixer, and while the mixer was run at low speed the epoxidized oil was added over a period of 3 minutes. The mixer was then run at high speed until the temperature of the batch reached 138° C. Vacuum was applied to the mixing chamber to reduce the pressure to 26 inches of mercury, with the agitation off. The chamber was opened to the atmosphere, and a small sample of the batch was removed for analysis by gas chromatography. No VCM could be detected.

The balance of the ingredients (impact modifier, processing aid, stabilizer, and lubricant) were then added and the mixer was run at high speed until the batch temperature reached 149° C., at which point the batch was dropped to the cooler. The batch was dropped from the cooler at 43° C., and when it had further cooled to room temperature it was analyzed for VCM by means of gas chromatography. No VCM could be detected.

The batch was then fused in a screw-type continuous mixer and fed as pigs to an L calender having roll surface temperatures of 149° C., 149° C., 177° C., 182° C., and 143° C. A film of 15 mils thickness was produced. When a portion of this film was analyzed by gas chromatography, no VCM could be detected.

We claim:

1. A process for reducing the vinyl chloride monomer content of dry particulate homopolymers of vinyl chloride or copolymers of vinyl chloride and at least one other monomer copolymerizable therewith, that consists of
   a. subjecting said dry particulate homopolymers or copolymers that contain up to about 15,000 parts by weight of vinyl chloride monomer per million parts per weight of polymer, in admixture with from 0 to about 10 parts by weight per 100 parts by weight of polymer of at least one heat stabilizer, from 0 to about 20 parts by weight per 100 parts by weight of polymer of an impact modifier, from 0 to about 5 parts by weight per 100 parts by weight of polymer of a processing aid, and from 0 to about 1 part by weight per 100 parts by weight of polymer of a lubricant, to vigorous agitation in an apparatus having an attrition and shearing action and thereby elevating the temperature of said particulate homopolymers or copolymers, said elevated temperature being lower than the fusion temperature of said homopolymers or copolymers, and b. subjecting said particulate homopolymers or copolymers, while at said elevated temperature, to subatmospheric pressure in the range of from about 10 to about 26 or more inches of mercury until they contain 2 parts or less of vinyl chloride monomer per million parts of polymer.

2. The process of claim 1 wherein said elevated temperature is at least about 120° C.

3. The process of claim 1 wherein dry particulate homopolymers or copolymers having a vinyl chloride monomer content of 1 part or less per million are obtained.

4. The process of claim 1 wherein dry particulate homopolymers or copolymers having a vinyl chloride monomer content undetectable by gas chromatography are obtained.

5. The process of claim 1 wherein the dry particulate homopolymer of vinyl chloride is a low molecular weight vinyl chloride homopolymer.

6. The process of claim 1 wherein the dry particulate copolymer is a low molecular weight copolymer of vinyl chloride and ethylene.

7. The process of claim 1 wherein the heat stabilizer is an organotin compound.

8. The process of claim 7 wherein the organotin compound is dibutyltin bis(isooctyl thioglycolate).

9. The process of claim 1 wherein the heat stabilizer is a calcium/zinc complex stabilizer.

10. The process of claim 1 wherein the heat stabilizer is an epoxidized oil.

* * * * *